Dec. 25, 1962  J. F. JOHNSON  3,070,000
BREWING APPARATUS
Filed Feb. 6, 1961  6 Sheets-Sheet 1

INVENTOR:
JAMES F. JOHNSON
BY
Marzall, Johnston, Cook & Root
ATT'YS

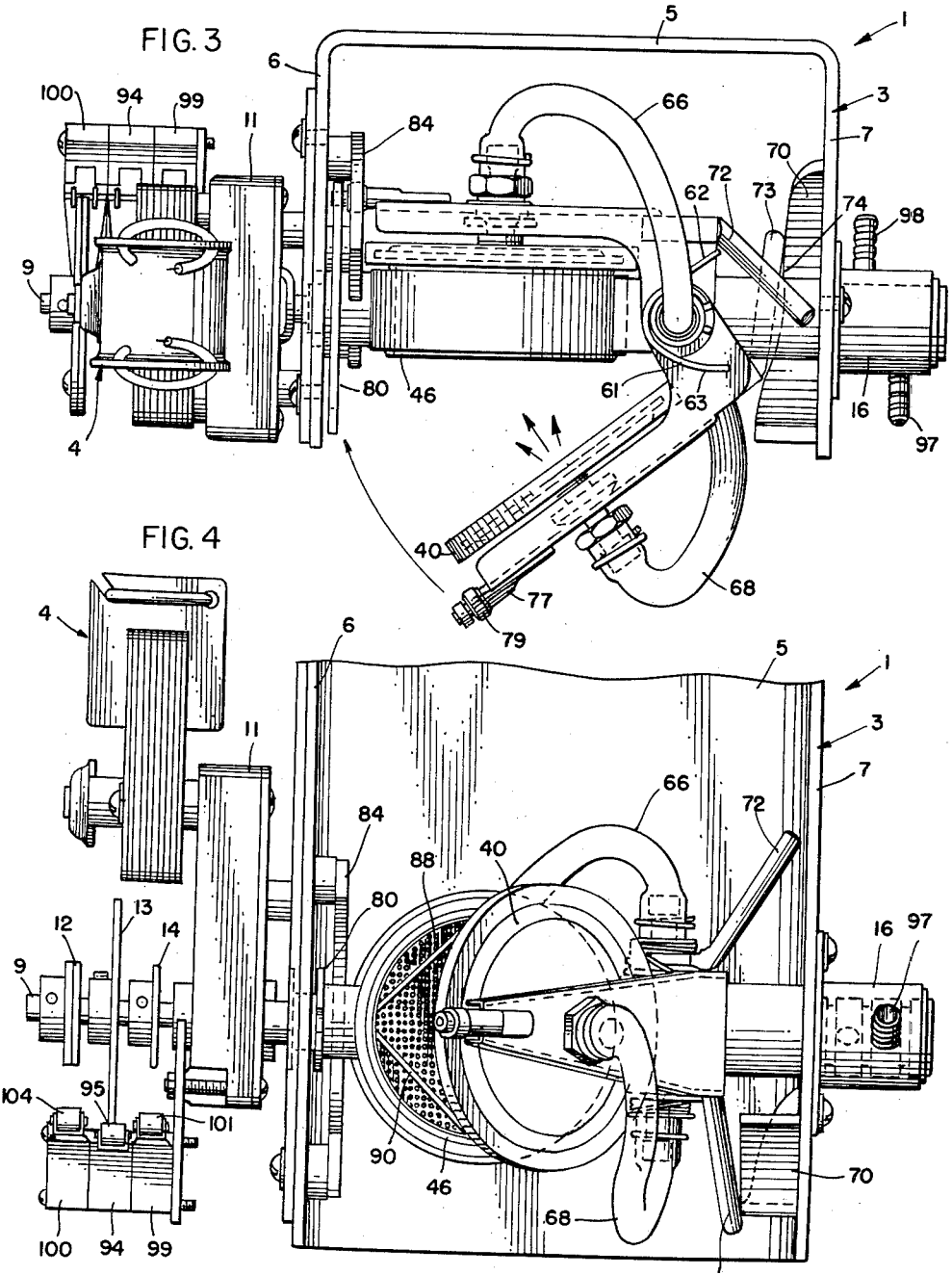

Dec. 25, 1962  J. F. JOHNSON  3,070,000
BREWING APPARATUS
Filed Feb. 6, 1961  6 Sheets-Sheet 3

INVENTOR:
JAMES F. JOHNSON
BY
Mazall, Johnston, Cook & Root
ATT'YS

Dec. 25, 1962 J. F. JOHNSON 3,070,000
BREWING APPARATUS
Filed Feb. 6, 1961 6 Sheets-Sheet 4

INVENTOR:
JAMES F. JOHNSON
BY
Marzall, Johnston, Cook & Root
ATT'YS

Dec. 25, 1962     J. F. JOHNSON     3,070,000
BREWING APPARATUS

Filed Feb. 6, 1961     6 Sheets-Sheet 5

INVENTOR:
JAMES F. JOHNSON
BY
ATT'YS

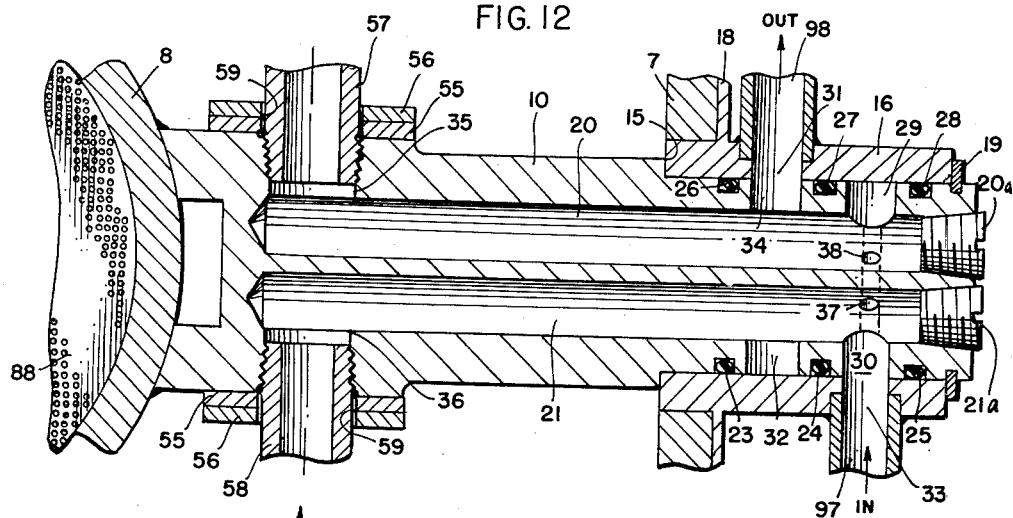

United States Patent Office 3,070,000
Patented Dec. 25, 1962

3,070,000
BREWING APPARATUS
James F. Johnson, La Grange Park, Ill., assignor to Automatic Canteen Company of America, Chicago, Ill., a corporation of Delaware
Filed Feb. 6, 1961, Ser. No. 87,460
20 Claims. (Cl. 99—289)

This invention relates to brewing apparatus and, more particularly, to brewing apparatus which is particularly well adapted for brewing hot beverages such as coffee, tea, and the like.

It is a primary object of the present invention to afford a novel brewing apparatus of the aforementioned general type.

It will be appreciated by those skilled in the art that although for the purposes of illustration the present invention is disclosed herein as embodied in a coffee brewing apparatus, this is merely by way of illustration and not by way of limitation, and that the present invention may, if desired, be embodied in other brewing apparatus such as, for example, tea brewing apparatus, and the like.

The present invention relates, in general, to beverage brewing apparatus of a type wherein a brewing material is fed into a brewing container, and a brewing liquid is then fed into the container and brewed liquid is discharged therefrom while the container is maintained in closed condition. Thereafter, at least a portion of the brewing material is dumped from the container, and the container is flushed with a suitable flushing liquid such as water.

It is another object of the present invention to afford a novel brewing apparatus wherein the parts thereof are so constituted and arranged that each new charge of brewing material into the apparatus may comprise only one-half of the total amount of brewing material subjected to brewing liquid during a brewing operation, and each such charge may be used in two brewing operations before it is discarded or dumped from the apparatus.

Another object is to enable freshly brewed coffee, and the like, to be brewed and dispensed in a novel and expeditious manner.

A further object of the present invention is to afford a novel brewing apparatus for coffee, and the like, embodying parts constituted and arranged in a novel and expeditious manner.

Another object is to afford a novel brewing apparatus whereby a single cup of coffee may be brewed and dispensed commercially in a novel and expeditious manner during each cycle of operation of the apparatus.

An object ancillary to the foregoing is to enable such coffee to be brewed from ground coffee as distinguished from so-called instant coffee, or the like.

Another object of the present invention is to enable novel apparatus of the aforementioned type to be afforded which is capable of dispensing individually brewed cups of coffee of high quality at the rate of several cups per minute.

Yet another object is to provide novel brewing apparatus of the aforementioned type which is rinsed in a novel and expeditious manner after each brewing and dispensing operation.

A further object of the present invention is to afford brewing apparatus of the aforementioned type which is relatively small and compact in size.

Another object is to afford novel brewing apparatus of the aforementioned type which is practical, efficient, and reliable in operation and may be readily and economically produced commercially.

Other and further objects of the present invention will be apparent from the following description and claims and are illustrated in the accompanying drawings which, by way of illustration, show the preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 3 is a top plan view of the brewing apparatus shown in FIG. 1 with the brewing container disposed in a rinse position;

FIG. 4 is a front elevational view of the apparatus shown in FIG. 3;

FIG. 12 is an enlarged detail sectional view taken substantially along the line 12—12 in FIG. 2;

FIG. 13 is a detail end elevational view taken substantially along the line 13—13 in FIG. 1;

FIG. 14 is a detail end elevational view similar to FIG. 13 but showing certain parts in different position;

FIG. 15 is a wiring diagram of the brewing apparatus shown in FIG. 1; and

Figure 1:
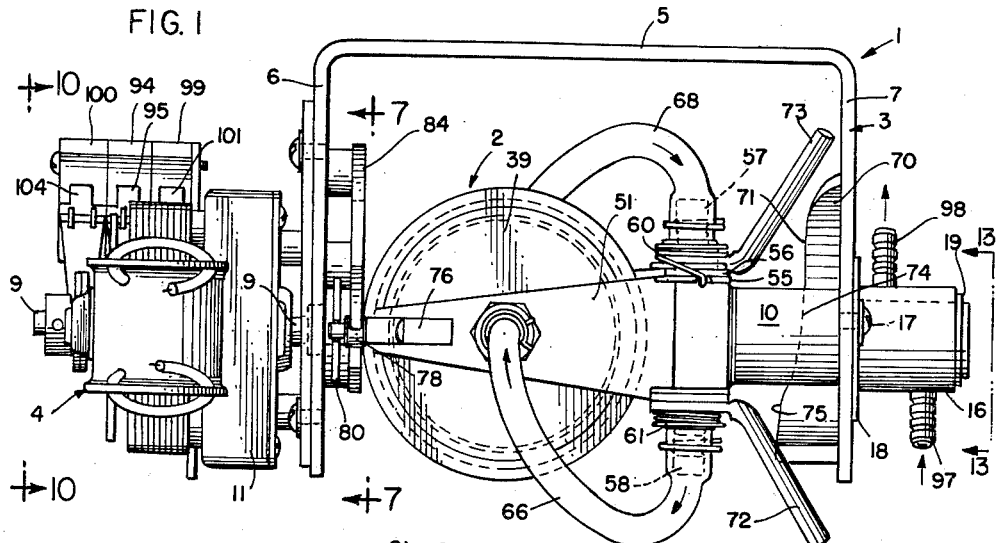
FIG. 1 is a top plan view of a brewing apparatus embodying the principles of the present invention, with the brewing container shown disposed in brewing position.

In the drawings, a brewing apparatus 1, embodying the principles of the present invention is shown to illustrate the preferred embodiment of the present invention.

Figure 2:
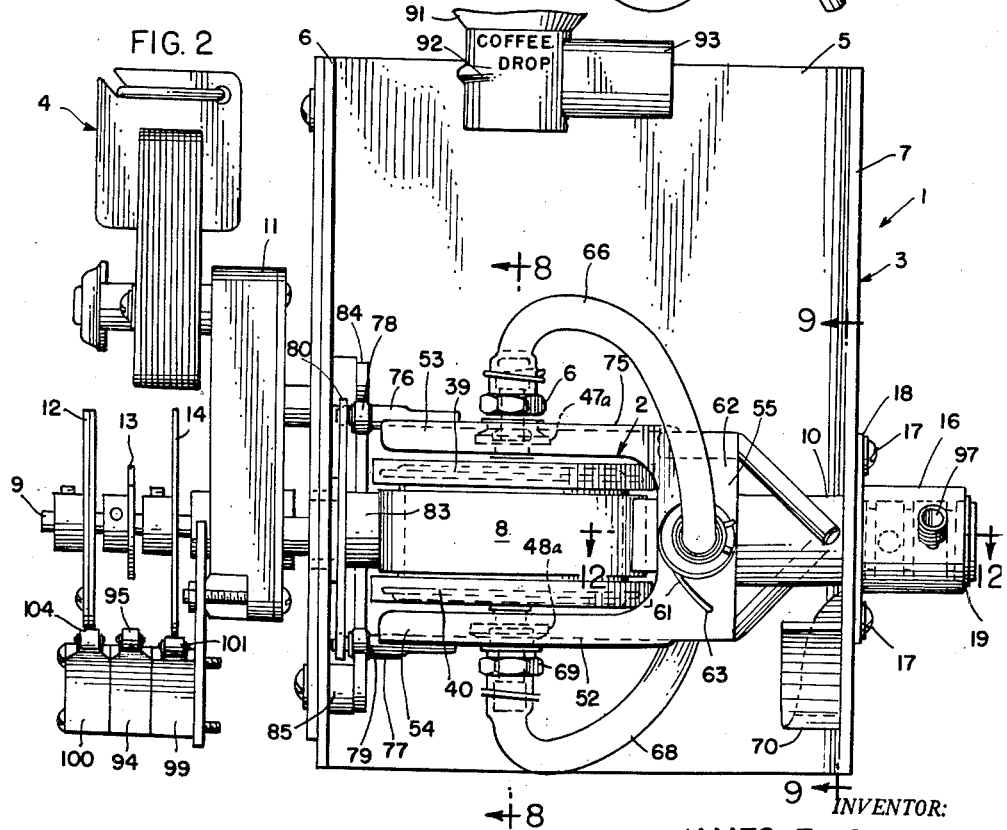
FIG. 2 is a front elevational view of the brewing apparatus shown in FIG. 1, with the brewing container shown disposed in a position slightly ahead of the position shown in FIG. 1.

The brewing apparatus 1 includes, in general, FIGS. 1 and 2, a brewing container or brewing chamber 2 rotatably mounted on a substantially channel-shaped housing or supporting member 3, a motor 4 being mounted on the supporting housing 3 and operatively connected to the brewing chamber 2 for rotating the latter around a horizontal axis of rotation within the housing 3 during a cycle of operation of the brewing apparatus 1.

The supporting housing 3 includes a substantially vertically extending rear wall 5 and two oppositely disposed, substantially parallel, vertically extending side walls 6 and 7 projecting forwardly therefrom.

Figure 8:
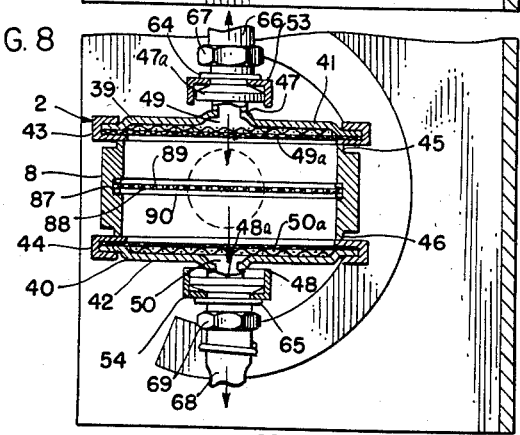
FIG. 8 is a detail sectional view taken substantially along the line 8—8 in FIG. 2.
Figure 9:
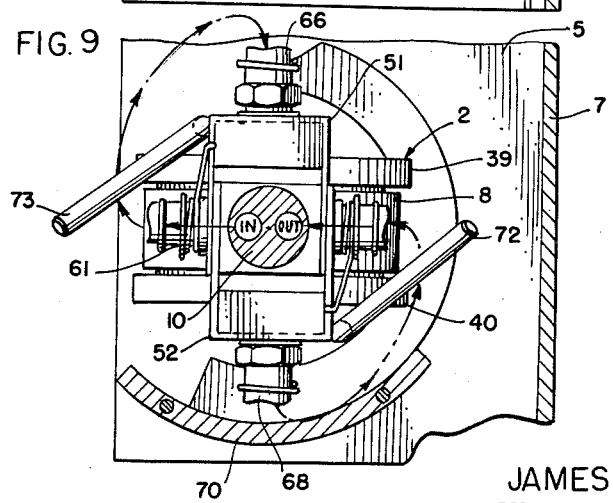
FIG. 9 is a detail sectional view taken substantially along the line 9—9 in FIG. 2.
Figure 10:
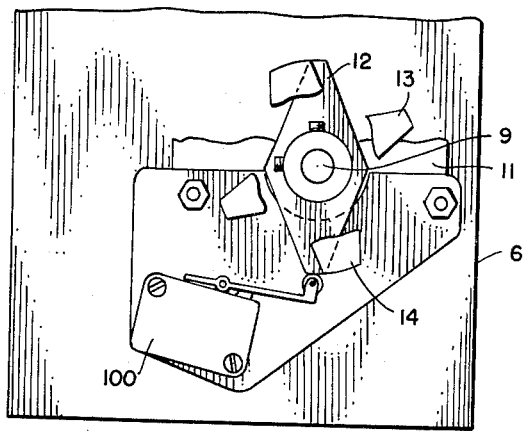
FIG. 10 is a fragmentary detail side elevational view taken substantially along the line 10—10 in FIG. 1.
Figure 11:
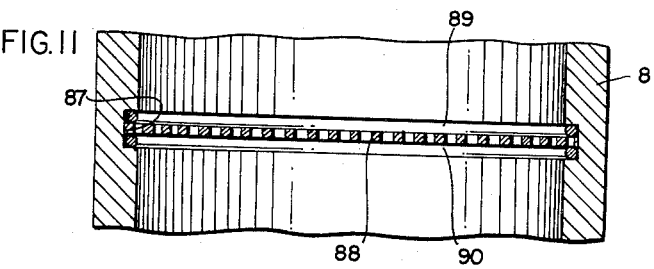
FIG. 11 is an enlarged detail sectional view of a portion of the brewing chamber shown in FIG. 8.
Figure 16:
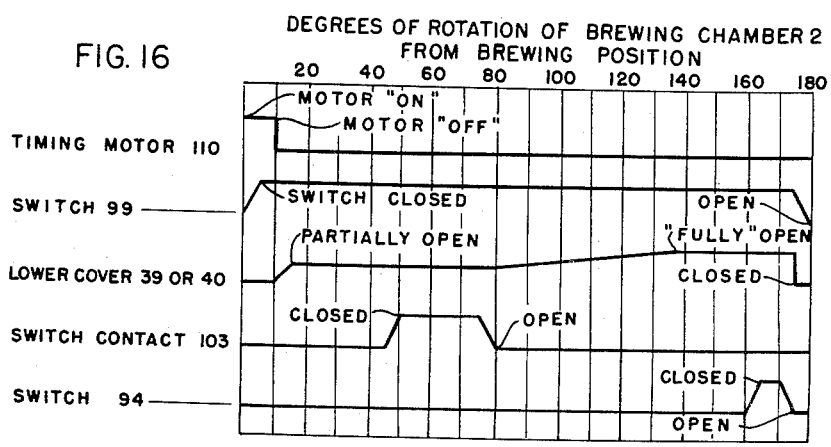
FIG. 16 is a timing chart of the operation of the brewing apparatus shown in FIG. 1.

The brewing container 2 includes a substantially cylindrical-shaped or cup-shaped body portion 8, FIGS. 1, 2, and 8, having two longitudinally aligned, diametrically opposed shafts 9 and 10 projecting outwardly therefrom and extending through the side walls 6 and 7, respectively, of the housing 3, to thereby rotatably mount the brewing container 2 in the housing 3, forwardly of the rear wall 5.

A reduction gear unit 11 is mounted on the outer face of the side wall 6 of the supporting housing 3, and the electric motor 4 is mounted on the upper end portion of the reduction gear 11. The motor 4 is connected through the reduction gear 11 to the shaft 9, and is effective upon energization of the motor 4 to rotate the brewing container 2 in a clockwise direction as viewed in FIG. 8. The drive shaft 9 extends through the reduction gear 11, and three cams 12, 13, and 14 are mounted on and secured to the outer end portion thereof for rotation therewith, for a purpose which will be discussed in greater detail presently.

The shaft 10, which projects through the side wall 7 of the supporting housing 3, has an outwardly facing shoulder 15 thereon, FIG. 12, which is disposed in abutting engagement with the inner face of a sleeve member 16 when the shaft 10 is disposed in normal operative position therein. The sleeve or fitting 16 is mounted on the shaft 10 and is secured to the side wall 7 in non-rotatable relation thereto by screws 17 extending through an outwardly projecting flange 18 on the sleeve 16, FIGS. 1, 2, and 12. The shaft 10 is mounted in the sleeve 16 with a relatively snug, but freely rotatable fit. A snap ring 19 mounted on the outer end portion of the shaft 10 is effective, with the shoulder 15, to hold the shaft 10 against longitudinal movement relative to the side wall 7 and the sleeve 16. The shaft 10 and sleeve 16 afford a novel valve for controlling the flow of liquid into and out of the brewing chamber 2, as will be discussed in greater detail presently.

The shaft 10 has two parallel, longitudinally extending openings 20 and 21 formed therein. The openings 20 and 21 open outwardly through the outer end of the shaft 10, and terminate at their inner ends inwardly of side wall 7, but in outwardly spaced relation to the body portion 8 of the brewing chamber 2, FIG. 12. The outer ends of the openings 20 and 21 are closed by suitable means such as, for example, plugs 20a and 21a threaded thereinto, respectively.

Three annular grooves 23, 24, and 25 are formed in the outer peripheral surface of the shaft 10, outwardly of the side wall 7, the grooves 23, 24, and 25 being disposed in parallel spaced relation to each other, FIG. 12. Three O-rings 26, 27, and 28 are mounted in the grooves 23—25, respectively, in position to afford seals between the shaft 10 and the sleeve 16.

Two diametrically opposed openings 29 and 30 extend radially through the side walls of the outer end portion of the shaft 10 into communication with the openings 20 and 21, respectively. The openings 29 and 30 are disposed between the O-rings 27 and 28. Two other diametrically opposed openings 31 and 32 extend radially through the side walls of the shaft 10 into communication with the openings 20 and 21, these latter openings 31 and 32 being disposed between the O-rings 26 and 27. Two other openings 33 and 34 extend through the side walls of the sleeve 16 in the same vertical plane as the openings 29 and 30, and the openings 31 and 32, respectively, for a purpose which will be discussed in greater detail presently.

Inwardly of the side wall 7, two additional diametrically opposed openings 35 and 36 extend radially through the side wall of the shaft 10 into the openings 20 and 21 therein, FIG. 12. At the other end of the shaft 10, two additional passageways 37 and 38 extend from the outer periphery of the shaft 10 into communication with the passageways 20 and 21, in the same vertical plane as the opening 33. The openings 37 and 38 permit the flow of liquid through the passageways 20 and 21 to be reversed from its normal direction during a rinsing operation, as will be discussed in greater detail presently.

The brewing chamber 2 also includes two cover members 39 and 40 for closing the respective opposite ends of the body portion 8, FIGS. 1, 2, and 8. The cover members 39 and 40, each include substantially circular-shaped disks 41 and 42, respectively, made of suitable material such as, for example, stainless steel. Resilient annular gasket rings 43 and 44, made of suitable material such as neoprene, are mounted on each of the disks 41 and 42, respetcively, and are disposed in overlying relation to the outer peripheral edge of the respective disks 41 and 42, FIG. 8. The gaskets 43 and 44 are disposed on the disks 41 and 42 in such position as to sealingly engage annular flanges 45 and 46, which project axially outwardly from the opposite ends of the body portion 8, when the cover members 39 and 40 are disposed in closed position as shown in FIG. 8. Each of the disks 41 and 42 has a centrally disposed, outwardly projecting nipple 47 and 48, respectively, in communication with a central opening 49 and 50 in the disks 41 and 42, and two screens 49a and 50a are mounted on the inside face of the disks 41 and 42 in covering relation thereto. The screens 49a and 50a are of relatively fine mesh, such as, for example, 150 mesh with an open area of 16 percent, and are held in position on the disks 41 and 42 by the gaskets 43 and 44, respectively.

Two substantially L-shaped levers 51 and 52, each having a relatively long leg 53 and 54, and a relatively short bifurcated leg 55 and 56, respectively, FIGS. 1, 2, and 12, are rotatably mounted on fittings 57 and 58 screwed into the openings 35 and 36, respectively, in the shaft 10. The fittings 57 and 58 extend through openings 59 in the free end portions of the legs 55 and 56 of the levers 51 and 52, the bifurcations of the legs 55 and 56 being disposed on opposite sides of the shaft 10, FIGS. 1 and 12. Two torsion springs 60 and 61 are disposed around the fittings 57 and 58, respectively, and each spring has one free end 62 connected to one bifurcation of the leg 55 and another end portion 63 connected to one bifurcation of the leg 56. The torsion springs 60 and 61 are effective to urge the lever 51 to rotate in a counterclockwise direction, as viewed in FIG. 2, and to urge the lever 52 to rotate in a clockwise direction as viewed in that figure.

The nipples 47 and 48 on the cover disks 41 and 42 are threaded into nuts 47a and 48a, which extend through the legs 53 and 54 of the levers 51 and 52, respectively. The nuts 47a and 48a are held in the legs 53 and 54 by snap rings 64 and 65, respectively, but are mounted in the legs 53 and 54 with a relatively loose fit so that the cover members 39 and 40 are pivotable to a limited extent relative to the levers 51 and 52 to facilitate disposing the cover members 39 and 40 in sealing relation to the respective adjacent ends of the body portion 8. Lock nuts 67 and 69 are threaded onto the nipples 47 and 48 and are engaged with the nuts 47a and 48a to hold the latter in position on the nipples 47 and 48.

One end of a conduit 66 is connected to the nipple 47 on the cover member 39, and the other end of the conduit 66 is connected to the fitting 58 on the shaft 10. Similarly, one end of a conduit 68 is connected to the nipple 50 on the cover member 40, and the other end of the conduit 68 is connected to the fitting 57 on the shaft 10. The conduits 66 and 68 may be made of any suitable material, but preferably, are made of relatively flexible material such as, for example, rubber or neoprene.

Figure 5:
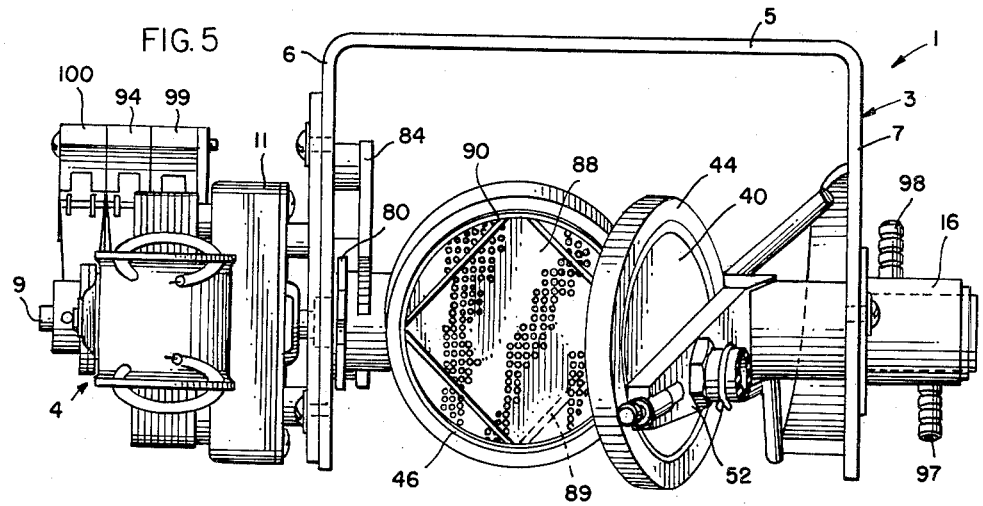
FIG. 5 is a top plan view of the brewing apparatus shown in FIG. 1, with the brewing container disposed in position to receive a new charge of ground coffee.
Figure 6:
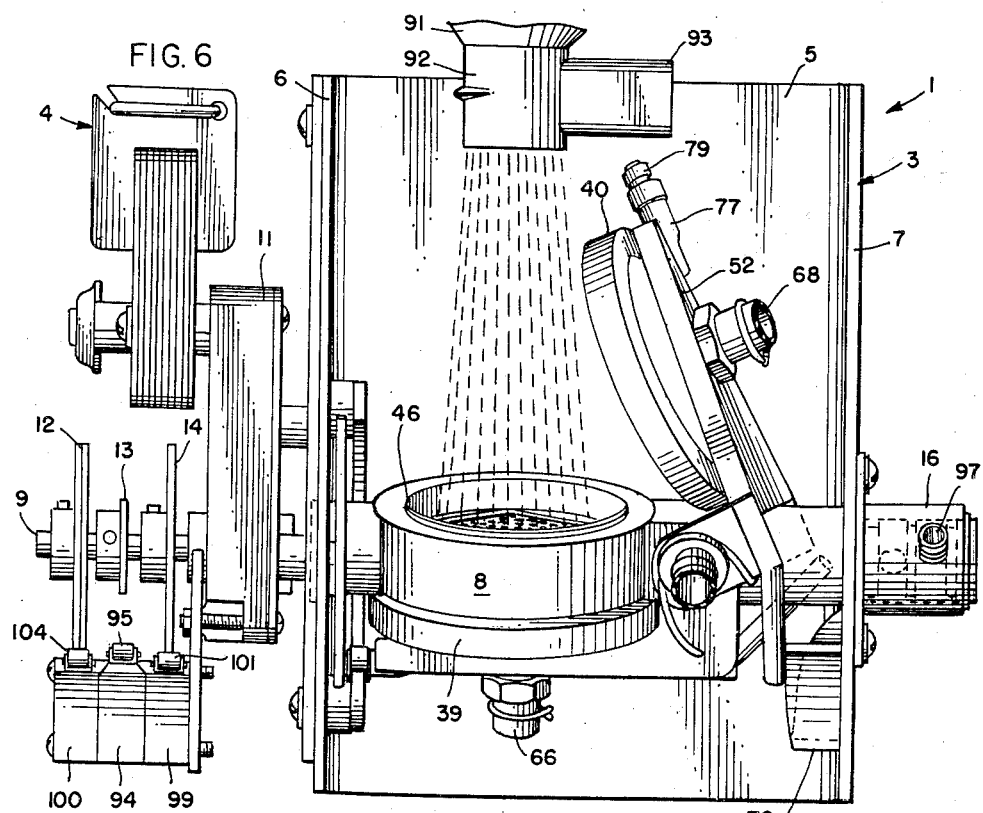
FIG. 6 is a front elevational view of the coffee apparatus shown in FIG. 1, with the brewing container disposed in the position shown in FIG. 5.

A substantially arcuate-shaped cam 70, FIGS. 1 and 2, having a cam surface 71, is mounted on the inner face of the side wall 7 of the supporting housing 3 by suitable means such as, for example, welding, in such position that cam 70 is disposed directly below the shaft 10 in concave upwardly facing position, with the cam surface 71 facing inwardly away from the side wall 7. Two cam followers in the form of elongated levers 72 and 73 are mounted on the levers 51 and 52, respectively, in position to engage the cam surface 71 during each rotation of the brewing container 2. During rotation of the brewing chamber 2, the cam followers 72 and 73 first ride onto a relatively long dwell portion 74 of the cam surface 71 and then onto a dwell portion 75 thereof. When the cam followers 72 or 73 are disposed in engagement with the dwell portion 74 of the cam 70, the cam follower 72 or 73 is effective to hold the respective cover member 39 or 40 in partially open position, as shown in FIGS. 3 and 4. When the cam followers 72 and 73 are disposed in engagement with the dwell portion 75, they are effective to hold the covers 39 and 40, resspectively, in a more fully open position, as shown in FIGS. 5 and 6. When the cam followers 72 and 73 ride off from the cam 70, the springs 60 and 61 are effective to quickly close the covers 39 and 40, respectively, with substantially a snap action.

Two fingers 76 and 77 are mounted on the free end portions of the longitudinal center lines of the legs 53 and 54 of the levers 51 and 52, respectively, and project outwardly therefrom, FIGS. 1 and 2. The fingers 76 and 77 each have a roller 78 and 79, respectively, mounted thereon, inwardly of the free ends thereof and outwardly of the levers 51 and 52. A substantially rectangular-shaped plate 80, FIGS. 1, 2, and 7, having notches 81 and 82 formed in the respective opposite ends thereof, is mounted on a boss 83, which projects outwardly from the body portion 8 of the brewing container 2 around the drive shaft 9, the plate 80 being secured to the boss 83 for rotation therewith. The recesses 81 and 82 are of such size and shape, and the plate 80 is so disposed on the body portion 8 of the brewer chamber 2, that when the covers 39 and 40 are disposed in closed position on the body portion 8, the free end portions of the fingers 76 and 77, outwardly of the rollers 78 and 79, are disposed in the slots 81 and 82, respectively, with a relatively snug, but freely movable fit, to thereby guide the cover members 39 and 40 into and out of properly closed position on the body member 8 during opening and closing of the cover members 39 and 40.

Figure 7:
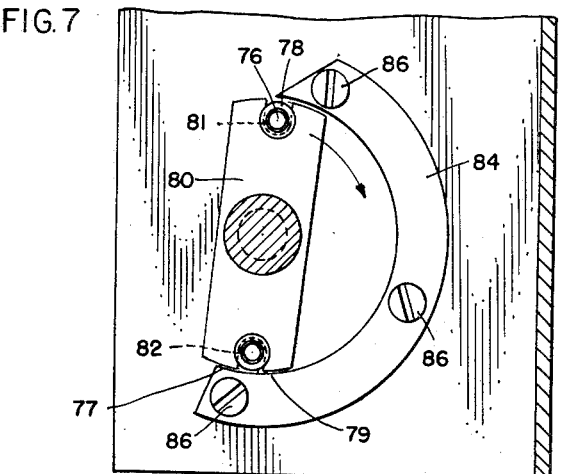
FIG. 7 is a detail sectional view taken substantially along the line 7—7 in FIG. 1.

A substantially arcuate-shaped locking member 84, FIGS. 1, 2, and 7, is secured to the inner face of the side wall 6 of the supporting housing 3, in generally forwardly opening position. Spacers 85 are disposed between the locking member 84 and the side wall 6, so that the locking member 84 is spaced inwardly from the side wall 6, and disposed in the vertical plane of the rollers 78 and 79. Screws 86, extend through the locking member 84 and the spacing members 85 and secure the locking member 84 and the spacing members 85 to the side wall 6.

The locking member 84 is so positioned on the side wall 6 of the housing 3, that when the brewing chamber 2 is disposed in normal at-rest, or "brewing" position, as shown in FIGS. 1 and 7, the rollers 78 or 79 of the uppermost one of the cover members 51 and 52, respectively, is disposed in snug underlying engagement with the upper end portion of the inner periphery of the locking member 84, as shown by the roller 78 in FIG. 7. The arc of the inner periphery of the locking member 84 is somewhat greater than that of a semi circle, preferably being approximately 187 degrees. Thus, it will be seen that when one of the rollers 78 or 79, respectively, is disposed under the upper peripheral end of the locking member 84, the other roller 79 or 78, respectively, is disposed in engagement with the inner periphery of the lower end portion of the locking member 84, and is disposed slightly less than 10 degrees from the lower face end of the locking member 84.

The cam 70 is so positioned on the side wall 7 of the housing 3, and the cam follower levers 72 and 73 are so positioned on the levers 51 and 52, that the cam follower 72 or 73 on the lowermost (for example, the cover member associated with roller 79 as seen in FIG. 7) one of the cover members 39 or 40, respectively, moves into engagement with the cam 70 after the brewing chamber 2 has rotated in a clockwise direction, as viewed in FIG. 7, through an arc of 10 degrees from brewing position. Thus, it will be seen that when the cam follower 72 or 73 moves into engagement with the cam 70, the corresponding roller 78 or 79, respectively, has moved out of engagement with the lower end of the locking member 84, so that cover 39 or 40, respectively, is free to be opened by the action of the cam 70. During continued rotation of the brewing chamber 2 in in the aforementioned direction, the cam follower 72 or 73, which is engaged with the cam 70, rides off from the cam 70 at approximately 175 degrees of rotation from the aforementioned brewing position shown in FIG. 7. Thus, the cover member 49 or 40, is released by the cam 70 for closing by the springs 60 and 61 approximately 5 degrees prior to a complete 180 degree rotation of the brewing chamber 2. When the cover 39 or 40 is thus released from the cam 70, the springs 60 and 61 are effective to snap the cover 39 or 40 closed sufficiently quickly that the finger 76 or 77 thereon is disposed in the respective recess 81 or 82, with the respective roller 78 or 79 disposed in position to ride under the inner periphery of the locking member 84 at the close of a complete 180 degree of rotation, at which time the brewing container 2 is again in "brewing" position.

The body portion 8 of the brewing chamber 2 has an annular-shaped recess 87 formed in its inner peripheral surface, midway between the ends thereof. A screen or perforated plate 88 preferably having openings therethrough, which are $\frac{1}{32}$ inch in diameter, with an open area of approximately 30 percent, extends across the body portion 8 and is disposed in the slot 87 in axially centered relation thereto. The screen 88 is removably retained in the slot 87 by suitable means such as, for example, substantially U-shaped, wire-retaining springs 89 and 90 disposed on opposite sides of the screen 88 and engaged in the recesses 87, FIGS. 5 and 8.

The brewing material, such as, for example, ground coffee, to be fed into the brewing chamber 2 during a cycle of operation of my device may be stored in any suitable source such as a reservoir 91, FIGS. 2 and 6, having a discharge nozzle 92, may be mounted by suitable means, not shown, directly above the brewing container 2, in such position that when either of the covers 39 or 40 is disposed in the substantially fully opened position, such as the position at which the cover 40 is shown in FIG. 5, and the brewing material is discharged from the nozzle 92, the thus discharged brewing material falls into the body portion 8 through the upwardly facing open end thereof. A suitable control valve such as, for example, a solenoid-operated valve 93, FIGS. 2 and 15, may be mounted on the reservoir 91 in position to control the discharge of coffee therefrom through the nozzle 92.

As will be discussed in greater detail presently, a normally open switch 94, FIGS. 2 and 15, is mounted on the side wall 6 of the housing 3 in such position that the cam 13 is effective to engage the actuator 95 of the switch 94 and close the switch 94 at approximately 165 degrees of rotation from brewing position of the container 2. This, it will be seen, is while the upper cover member 39 or 40 is being held open by the dwell portion 75 of the cam 70. The switch 94 is held closed by the cam 13 through approximately 10 degrees of rotation of the brewing chamber 2, and is connected to the windings of the solenoid valve 93 to thereby open the valve 93 and cause brewing material to be discharged from the nozzle 92 into the brewing chamber 2, during this 10 degrees of rotation thereof.

Brewing liquid, such as, for example, hot water, may be fed into the brewing apparatus 1 from a suitable source, not shown, through a conduit 97, FIG. 12, which is connected into the opening 33 in the sleeve 16. The openings 29—32, 35 and 36 are so positioned in the shaft 10, and the openings 33 and 34 are so positioned in the sleeve 16, that when the brewing container 2 is disposed in the brewing position shown in FIGS. 2 and 7, with the cover 39 disposed on top, the inlet opening 30 in the shaft 10 is in communication with the inlet opening 33 in the sleeve 16, the outlet opening 31 in the shaft 10 is in communication with the outlet opening 34 in the sleeve 16, and the openings 29 and 32 in the sleeve 16, and the openings 29 and 32 in the sleeve 16 are sealed by the inner periphery of the sleeve 16. Thus, it will be seen that when liquid, such as water, is fed inwardly through the conduit 97 into the opening 33 in the sleeve 16, with the brewing container 2 disposed in the brewing position shown in FIG. 1, the water flows from the opening 33 through the opening 30, the passageway 21, the opening 36, the fitting 58, the conduit 66, the fitting 67, the nipple 47, the opening 49 and the screen 49a into the body portion 8 of the brewing container 2, FIGS. 2, 8, and 12. This liquid then passes through the screen 88 and outwardly from the brewing container 2 through the screen 50a, the opening 50, the nipple 48, the fitting 69, the conduit 68, the fitting 57, the opening 35, the passageway 20, the opening 31, and the opening 34, outwardly from the sleeve 16. A conduit such as the conduit 98 may be mounted in the opening 34 in the sleeve 16 to feed the thus discharged liquid into the proper position, such as, for example, into a cup, not shown.

When the brewing container 2 has been rotated 180 degrees from the brewing position shown in FIG. 1, into the brewing position, not shown, wherein the cover member 40 is disposed on top, the shaft 10 has also been rotated 180 degrees in the sleeve 16, in which position the openings 29 and 32 are disposed in communication with the openings 33 and 34, respectively, in the sleeve 16, and the openings 30 and 31 in the shaft 10 are sealed by the inner periphery of the sleeve 16. In this position of the brewing container 2, when liquid is fed inwardly through the conduit 97, it passes through the opening 33, the opening 29, the passageway 20, the opening 35, the fitting 57, the conduit 68, the fitting 69, the nipple 48, the opening 50, and the screen 50a into the body portion 8 of the brewing chamber 2. This liquid then passes through the screen 88 and outwardly from the brewing chamber 2 through the screen 49a, the opening 49, the nipple 47, the fitting 67, the conduit 66, the fitting 58, the passageway 21, and the opening 32, outwardly through the opening 34 and the conduit 98 in the sleeve 16. Thus, it will be seen that during a brewing operation, the brewing liquid is always fed inwardly through the conduit 97 and outwardly through the conduit 98 on the sleeve 16, and, also, is always fed downwardly through the brewing chamber 2.

Two other switches 99 and 100 are mounted on the side wall 6 of the supporting housing 3, FIGS. 1, 2, 10, and 15. The switch 99 is a normally closed switch, and the cam 14 is so constituted and arranged that when the brewing chamber 2 is disposed in either of the aforementioned brewing positions, it is operatively engaged with the actuator 101 of the switch 99, and is effective to hold the switch 99 in open position, for a purpose which will be discussed in greater detail presently.

The switch 100 is a two-way switch, embodying a normally closed contact 102 and a normally open contact 103, FIG. 15. The cam 12 is so constituted and arranged that after approximately 45 degrees of rotation of the brewing chamber 2 from brewing position, it is effective to actuate the actuator 104 of the switch 100 to thereby open the contact 102 and close the contact 103. This is effective to energize the windings of a solenoid-actuated valve 106, FIG. 15, which is connected into the conduit 97, to thereby open the valve 106 and feed liquid through the conduit 97 into the opening 33 in the sleeve 16. At this time one of the passageways 37 or 38 in the shaft 10 is in communication with the opening 33. Thus, it will be seen that water is then fed in a reverse direction through the shaft 10, and the brewing apparatus 1, that is, it is fed upwardly through the lowermost cover member 39 or 40. During this time, the lowermost cover member 39 or 40 is disposed in the aforementioned partially open position shown in FIGS. 3 and 4 and, therefore, the liquid thus fed through the shaft 10 passes upwardly through the lowermost screen 49a or 50a to thereby rinse the coffee grounds off from the lowermost cover member 39 or 40, respectively, the passage of the water downwardly through the body portion 8 during the immediately preceding brewing operation having been effective to deposit the grounds in lowermost portion of the brewing chamber on the lowermost cover member 39 or 40. The cam 12 is effective to hold the switch 100 in this actuated position through approximately 30 degrees of rotation of the brewing chamber 2.

The brewing apparatus 1 also includes a timing mechanism 107, FIG. 15, including a normally closed switch 108, a normally open switch 109, a timing motor 110 for actuating the switches 108 and 109, and a normally open relay actuated switch 111.

The operation of the brewing apparatus 1 is automatic after a cycle of operation has been initiated. Such a cycle of operation may be initiated by substantially momentarily closing a switch such as the switch 112 shown in FIG. 15 to thereby close the circuit from one side 113 of a suitable source of electric power, such as, for example, a wall plug, through a conductor 114, the switch 112, a conductor 115, the timing motor 110, a conductor 116, and a conductor 117, back to the other side 118, of the source of electric power. It will be seen that the closing of the switch 112 also causes the relay 119 of the relay actuated switch 111 to be energized, thereby closing the switch 111. This sets up a holding circuit for the timing motor 110, which extends from the side 113 of the line through the conductor 114, a conductor 120, a conductor 121, the normally closed switch 108 of the timing mechanism 107, a conductor 122, the then closed switch 111, a conductor 123, the conductor 115, the timing motor 110, the conductor 116, and the conductor 117 back to the other side 118 of the line. This holding circuit remains energized so long as the switch 108 of the timing mechanism 107 remains closed.

During the brewing portion of the cycle of operation, which preferably is for a period of approximately nine seconds, the timing motor 110 is ineffective to actuate either the timing switch 108 or the timing switch 109. Thus, it will be seen that the motor 4 remains de-energized, and, therefore, the brewing container 2 remains stationary in brewing position during this time. During this period, the windings of the solenoid-actuated water control valve 106 are energized, the circuit therefor being from the side 113 of the line through the conductors 114, 120, and 121, the switch 108, the conductor 122, the relay actuated switch 111, a conductor 124, the upper contact 102 and the intermediate contact 125 of the switch 100, a conductor 126 connected to the contact 125, the windings of the solenoid valve 106, a conductor 127, and the conductor 117 back to the other side 118 of the line. The energization of the windings of the solenoid-actuated valve 106 is effective to open the valve 106 to thereby permit water to flow inwardly through the conductor 97 into the opening 33 in the sleeve 116. It will be remembered that this causes the water to flow from the conduit 97 through the shaft 10, downwardly through the brewing chamber 2, and then back through the shaft 10, and outwardly through the conduit 98 into discharge position such as, for example, into a cup to be vended from a vending machine.

The water flowing through the brewing chamber 2 is at a temperature sufficiently high to insure proper extraction of flavor from the ground coffee, or the like, in the brewing container 2, without extracting bitterness or other undesirable tastes therefrom. For this purpose in a coffee brewing cycle of operation, I prefer that the water passing through the brewing chamber be at a temperature of 190 degrees, Fahrenheit, and deem it advisable that it not be less than 185 degrees nor more than 205 degrees.

At the end of a brewing portion of the cycle of operation, the timing motor 110 becomes effective to close the switch 109, but momentarily remains ineffective to open the switch 108. The closing of the switch 109 causes the motor 4 to become energized, the circuit for so doing running from the side 113 of the line through the conductors 114, 120, and 121, the now closed timing switch 109, a conductor 128, the motor 4, a conductor 129, and the conductor 117 back to the other side 118 of the line. It will be remembered that, when the brewing chamber 2 is in brewing position, the cam 14 is engaged with the actuator 101 of the switch 99, to thereby hold the switch 99 in open position. The energization of the motor 4 at the end of a brewing cycle of operation causes the shaft 9, and, therefore, the cam 14 to rotate in a clockwise direction as viewed in FIG. 7. The rotation of the cam 14 with the drive shaft 9 on the brewing container 2 from brewing position causes the land thereof to move out of engagement with the actuator 101 of the switch 99, to thereby permit the switch 99 to close within 5 degrees of rotation of the shaft 9. The closure of the switch 99 sets up a holding circuit for the motor 4, which is effective throughout the remaining portion of the cycle of operation of the brewing apparatus 1 to maintain the motor 4 energized, the cam 14 at the close of 180 degrees of rotation of the drive shaft 9 being effective to again open the switch 99 to thereby deenergize the motor 4 and stop the operation thereof. This holding circuit for the motor 4 extends from the side 113 of line through the conductors 114 and 120, a conductor 130, the now closed switch 99, a conductor 131, the conductor 128, the motor 4, the conductor 129, and the conductor 117 back to the other side 118 of the line. The operation of the timing motor 110 is such that after the drive shaft 9 has been driven by the motor 4 through a rotation of 9 degrees from brewing position, the timing motor 110 causes the switch 108 to open thus breaking the circuit to the coil 119 of the relay operated switch 11, and thereby causing the switch 111 to open. The opening of the switch 111, breaks the circuit to the windings of the solenoid operated water control valve 106 to thereby close the valve 106 and shut off the flow of water to the brewing container 2. The overrun of the motor 110 again causes the timing switch 108 to close and the timing switch 109 to open, so that the timing mechanism 107 is in position for the next cycle of operation.

After 10 degrees of rotation of the drive shaft 9 by the motor 4 from the brewing position shown in FIGS. 1 and 7, the cam follower 73 on the then lowermost cover member 40 engages the rear end of the cam 70. During the next 5 degrees of rotation of the drive shaft 9, the cam follower 73 rides up onto the dwell portion 71 of the cam 70. This causes the cover 40 to move into the partially open position shown in FIGS. 3 and 4. During the next 75 degrees of rotation of the drive shaft 9, the cam follower 73 rides along the dwell portion 71 of the cam 70, to thereby hold the cover member 40 in the aforementioned partially open position. During this portion of the rotation of the drive shaft 9, and, therefore, of the brewing container 2, the cam 12 on the drive shaft 9 engages the actuator 104 of the switch 100 and causes the middle contact 125 thereof to move out of engagement with the upper contact 102 thereof and into engagement with the lower contact 103 thereof, the cam 12, after rotating an additional 25 degrees, riding off from the actuator 104 of the switch 100 to thereby permit the middle contact 125 to again move out of engagement with the lower contact 103 back into engagement with the upper contact 102. The middle contact 125 of the switch 100 is thus first moved by the cam 12 into engagement with the lower contact 103 when the shaft 9 has rotated 50 degrees, and then permitted to move out of engagement with the contact 103 when the shaft has rotated 75 degrees. The engagement of the middle contact 125 of the switch 100 with the lower contact 103 is effective to again energize the solenoid of the solenoid-operated water control valve 106. The circuit for thus energizing the solenoid 105 extends from the side 113 of the line, through the conductors 114, 120, and 130, a conductor 132, the lower contact 103, the middle contact 125, the line 126, the windings of the solenoid valve 106, the conductor 127, and the conductor 117 back to the other side 118 of the line. Thus, during this 25 degrees of rotation of the drive shaft 9, the solenoid 106 is again effective to permit water to flow through the conduit 97 into the opening 33 in the sleeve 16. During this portion of the rotation of the drive shaft 9, and, therefore, of the shaft 10, the outer end of the passageway 37 moves past the opening 33 in the sleeve 16. This, it will be seen, permits water to flow from the conduit 97, through the opening 33, the passageway 37, the passageway 20, the opening 35, the fitting 57 and the conduit 68, and to flow upwardly from the opening 50 in the lower cover member 40 of the brewing chamber 2 to thereby rinse the coffee grounds from the cover member 40. During this rinsing operation, the cover member 40 of the brewing chamber 2 is in the partially open position shown in FIGS. 3 and 4.

When the brewing chamber 2 has rotated through 90 degrees from brewing position, which is 15 degrees after the rinse switch 100 has again been released by the cam 12, so that the intermediate contact 125 has again moved from closed position with respect to contact 103 into closed position with respect to contact 102, to thereby deenergize the solenoid operated water valve 106, the cam follower 73 begins to ride up off from the dwell portion 74 of the cam 70 toward the dwell portion 75. The cam follower 73 rides onto the dwell portion 75 after the brewing container 2 has rotated through 135 degrees from brewing position. When the cam follower 73 rides onto the dwell portion 75, it is cammed thereby into such position that it is effective to hold the cover member 40 in substantially fully open position, as shown in FIGS. 5 and 6. While the cam follower 73 rides along the dwell portion 75 of the cam 70, during the next 40 degrees of rotation of the brewing container 2, the cam 13 on the drive shaft 9 engages the actuating member 95 of the switch 94, the cam 13 being effective to close the switch 94 when the brewing container 2 has rotated through approximately 165 degrees from brewing position, and holding the switch 94 closed during the next 10 degrees of rotation. Closure of the switch 94 is effective to complete a circuit through the windings of the solenoid operated valve 93, this circuit extending from the side 113 of the line through the conductors 114, 120, and 130, the switch 94, a conductor 133, the windings of the solenoid-operated valve 93, a conductor 134, and the conductor 117 back to the other side 118 of the line. The energization of the windings of the solenoid valve 93 is effective to open the valve 93, and thereby permit coffee to fall from the hopper 91 downwardly through the nozzle 92 into the then open upper end portion of the brewing container 2. When the brewing container 2 has rotated through 175 degrees from brewing position, the cam 13 rides off from the actuator member 95 of the switch 94, to thereby permit the switch 94 to open. This breaks the circuit to the solenoid valve 93, to thereby close the valve 93 and shut off the flow of ground coffee from the hopper 91 into the brewing container 2. Immediately thereafter, the cam follower 73 rides off from the dwell portion 75 of the cam 70, to thereby permit the cover 40 to be snapped shut by the springs 60 and 61 into closed position on the body portion 8 of the brewing container 2. During the next 5 degrees of rotation of the brewing container 2, the roller 79 on the cover member 40 moves under the upper end portion of the locking member 84, to thereby lock the cover member 40 against the body portion 8. Also, during this last-mentioned 5 degrees of rotation, the cam 14 moves into engagement with the actuator member 101 of the switch 99, and causes the switch 99 to open. The opening of the switch 99 breaks the circuit to the motor 4, to thereby cause the brewing container 2 to again stop in brewing position after 180 degrees of rotation from the previous brewing position.

At that time, with the screen 88 disposed in operative position in the body portion 8 of the brewing container 2, it will be seen that a half charge of freshly ground coffee, which has never been used, is disposed in the upper end portion of the brewing container 2, and a half charge of ground coffee which has been used in one brewing operation is disposed in the lower end portion of the brewing container 2. Also, it will be seen that at the close of this last-described cycle of operation the brewing chamber 2 and the shaft 10 thereon have been rotated 180 degrees from the position shown in FIGS. 1, 7, and 12. In this new position: the cover 40 is now on top of the brewing chamber 2 and the cover 39 is on the bottom thereof; the opening 29 in the shaft 10 is now aligned with the inlet opening 33 in the sleeve 16; and the opening 32 in the shaft 10 is now aligned with the outlet opening 34 in the sleeve 16. Hence, during the next brewing cycle of operation the brewing liquid passes downwardly into the brewing chamber 2 through the cover 40 and out through the cover 39, and into the shaft 10 through the passageway 20 and out through the passageway 21.

Also, during the rinse portion of this next cycle of operation, the position of the cross openings 37 and 38 is such that the cross passageway 38 is disposed in alignment with inlet opening 30 in the sleeve 16. Thus, it will be seen that, in the rinsing operation, the rinse water again passes upwardly from the lowermost cover member (in this instance, the cover member 39) to thereby rinse or flush the coffee grounds off from the lowermost cover member, the cam follower 72, during this new cycle of operation riding along the cam 70 to thereby open the cover member 39 for both the rinsing operation and the coffee dropping operation, as hereinbefore discussed with respect to the opening of the cover member 40 in the previous cycle of operation.

Each new cycle of operation of the brewing apparatus 1 may be initiated by momentarily closing the switch 112, and, thereafter, is entirely automatic. In one model of this apparatus which has been operated, an entire cycle of operation of the unit (including a nine-second brewing cycle) takes only twelve seconds to complete, and brewed coffee of high quality is afforded thereby.

In the operation of my novel apparatus 1, with the screen 88 in place, as shown in FIG. 8, and with the brewing liquid fed into the brewing chamber 2 at 190 degrees, Fahrenheit, I prefer that each new charge of ground coffee be six and one-half grams, so that the total charge of ground coffee in the brewing chamber 2 during each brewing cycle is 13 grams.

However, if desired, the screen 88 may be removed from the body portion 8 of the brewing container 2, by first removing the retaining springs 89 and 90, and the brewing apparatus 1 may then be operated with a completely new charge of ground coffee, or other brewing material, during each cycle of operation of the brewing apparatus. In such operation, I prefer that each charge of ground coffee be nine grams. It has been found that such operation also affords brewed coffee of high quality.

Therefore, it will be seen that although I prefer to use a charge of brewing material in my brewing apparatus 1, which is made up of half a charge of unused brewing material and half a charge of brewing material which has been used in one previous brewing operation, my invention is not limited thereto, and, if desired, the charge of brewing material may be made up of entirely fresh material. If necessary, the cam 13 may be adjusted on the drive shaft 9 to accommodate the variations in the type of charge of brewing material used in the brewing apparatus.

From the foregoing, it will be seen that I have afforded a novel brewing apparatus, which is particularly well adapted for use in commercial vending machines, and the like, for vending individual cups of hot coffee.

Also, it will be seen that I have afforded a novel brewing apparatus which may be relatively small and compact in size. For example, one brewing apparatus which has been constructed for the commercial vending of hot coffee, is of such size that the housing 3 thereof is approximately 6¾ inches high, 4¼ inches deep, and 5¼ inches wide, with the overall width of the brewing apparatus, from the left end of the drive shaft 9 to the right end of the shaft 10, as viewed in FIG. 2, being approximately 8¾ inches.

Also, it will be seen that I have afforded a novel valve for controlling the flow of liquid into and out of a brewing chamber, or the like.

In addition, it will be seen that I have afforded a novel brewing apparatus which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A brewing apparatus for subjecting brewing material to a brewing liquid to produce a brewed liquid and separating said brewed liquid from said brewing material, said apparatus comprising supporting means, a brewing container rotatably mounted on said supporting means and rotatable thereon through one hundred and eighty degrees of rotation from brewing position through rinsing position and back to brewing position, strainer means in said container, means for feeding brewing liquid into said container and brewed liquid through said strainer means and out of said container when said container is disposed in each of said brewing positions, means for rinsing at least a portion of said container when said container is moving through said rinsing position, and means for feeding brewing material into said container when said container is moving from said rinsing position to brewing position.

2. In a brewing apparatus for subjecting brewing material to a brewing liquid to produce a brewed liquid and separating said brewed liquid from said brewing material, said apparatus comprising supporting means, a brewing container rotatably mounted on said supporting means, said brewing container being normally disposed in brewing position and being rotatable on said supporting means through one hundred and eighty degrees of rotation from brewing position through rinsing position back to brewing position, means for feeding brewing liquid into said container and brewed liquid out of said container when said container is disposed in said brewing positions, means for rinsing at least a portion of said container when said container is moving through said rinsing position, and means for feeding brewing material into said container which said container is moving from said rinsing position to brewng position.

3. In a brewing apparatus for subjecting brewing material to a brewing liquid to produce a brewed liquid and separating said brewed liquid from said brewing material, said apparatus comprising supporting means, a brewing container rotatably mounted on said supporting means, said brewing container having a substantially cylindrical-shaped body member, and two cover members pivotally mounted on said body member for movement between open and closed positions relative to respective ends of said body member, said container having two brewing positions and two rinsing positions, means for rotating said container from one of said brewing positions through one of said rinsing positions to the other of said brewing positions and from said other brewing position through the other of said rinsing positions to said one brewing position in successive respective cycles of operation, said cover members being disposed in said closed positions when said container is disposed in said brewing positions, and means for moving said cover members to open positions during respective ones of said cycles of operation, 4. In a brewing apparatus for subjecting brewing material to a brewing liquid to produce a brewed liquid and separating said brewed liquid from said brewing material, said apparatus comprising supporting means, a brewing container rotatably mounted on said supporting means, said brewing container having a substantially cylindrical-shaped body member, and two cover members pivotally mounted on said body member for movement between open and closed positions relative to respective ends of said body member, said container having two brewing positions and two rinsing positions, means for rotating said container from one of said brewing positions through one of said rinsing positions to the other of said brewing positions and from said other brewing position through the other of said rinsing positions to said one brewing position in successive respective cycles of operation, said cover members being disposed in said closed positions when said container is disposed in said brewing positions, and each of said cover members being open during a portion of said rotation of said container between said brewing positions in respective ones of said cycles of operation.

5. In a brewing apparatus for subjecting brewing material to a brewing liquid to produce a brewed liquid and separating said brewed liquid from said brewing material, said apparatus comprising supporting means, a brewing container rotatably mounted on said supporting means and rotatable thereon through one hundred and eighty degrees of rotation from brewing position through rinsing position back to brewing position, means, including said last-mentioned means, for feeding brewing liquid into said container and brewed liquid out of said container when said container is disposed in each of said brewing positions, means, including said last-named means, for feeding rinsing liquid to at least a portion of container when said container is moving through rinsing position, and means operable in timed relation to said rotation of said container for feeding brewing material into said container during movement of said container from rinsing position to brewing position.

6. A brewing apparatus comprising a brewing container having a body portion and two cover members pivotally mounted on said body portion for movement between closed and open positions relative to said body portion, said container having two brewing positions, means, including a shaft, rotatably mounting said brewing container, strainer means in said container, means, including said shaft, for feeding brewing liquid into said container and feeding brewed liquid through said strainer means and out of said container when said container is disposed in said brewing positions, means, including said shaft, for feeding rinsing to one of said cover members during rotation of said container between said brewing positions, and means responsive to the position of said container between said brewing positions for feeding brewing material into said container during said rotation of said container from the position wherein said rinsing liquid is fed thereinto to brewing position.

7. A brewing apparatus comprising a brewing container having a body portion and two cover members pivotally mounted on said body portion for movement between closed and open positions relative to said body portion, said container having two brewing positions, a strainer screen mounted in said container and extending thereacross between said cover members, means, including a shaft, rotatably mounting said container for rotation between said brewing positions, means, including said shaft, and said cover members, for feeding brewing liquid through one of said cover members into said container and feeding brewed liquid through the other of said cover members and out of said container when said container is disposed in said brewing positions, means, including said shaft, and said cover members, for feeding rinsing liquid onto a portion of said container during rotation of said container between said brewing positions, and means resposive to the position of said container between said brewing positions for feeding brewing material into said container during said rotation of said container from the position wherein said rinsing liquid is fed thereinto to brewing position.

8. In a brewing apparatus comprising a brewing container having a body portion and two cover members pivotally mounted on said body portion for movement between closed and open positions relative to said body portion, said container having two brewing positions, means, including a shaft, rotatably mounting said container for rotation between said brewing positions, means, including said shaft, for feeding brewing liquid into said container and feeding brewed liquid out of said container when said container is disposed in said brewing positions, means responsive to the position of said container for opening one of said cover members during movement of said container from one of said brewing positions to the other of said brewing positions and opening the other of said cover members during movement of said container from said other brewing position to said one brewing position, and means, including said shaft and a respective one of said cover members, for feeding rinsing liquid onto said last-mentioned cover member when said last-mentioned cover member is open.

9. In a brewing apparatus, a brewing container including cover means movable between open and closed positions, said container being mounted on a rotatable member and being rotatable from a stationary position sequentially through a rinsing position and a brewing-material receiving position to a stationary position, means, including said cover means, for feeding liquid into said container when said container is stationary, and means for feeding liquid to a portion of said container when said container is disposed in said rinsing position.

10. In a brewing apparatus, a brewing container including two cover members movable between open and closed positions, means for moving said cover members one at a time from closed position to open position and back to closed position, means, including said cover members, for feeding liquid into and out of said container when said cover members are in closed position, and means, including each of said cover members, for feeding liquid into at least a portion of said container for rinsing the same when the respective cover member is disposed in open position.

11. In a brewing apparatus, a brewing container comprising a substantially cylindrical-shaped body portion, and two cover members pivotally mounted on respective opposite end portions of said body portion for movement between open and closed positions relative to said end portions, a screen removably mounted in and extending across said body portion midway between the ends thereof in position to separate one of said end portions from the other, each of said cover members having an opening therethrough and a screen mounted thereon between said opening and said first-mentioned screen passageways, interconnected with each of said openings for feeding liquid into and out of said container through said screens when said cover members are disposed in said closed positions, and means including each of said passageways for feeding liquid onto a portion of said container in a rinsing operation when the respective cover member in which said passageway is located is disposed in open position.

12. In a brewing apparatus, a brewing container comprising a substantially cylindrical-shaped body portion, and two cover members pivotally mounted on respective opposite end portions of said body portion for movement between open and closed positions relative to said body portion, a screen disposed in and extending across said body portion midway between the ends thereof in position to separate one of said end portions from the other, each of said cover members having an opening therethrough and a screen mounted thereon between said opening and said first-mentioned screen, said container having two stationary positions in each of which a respective one of said cover members is disposed above the other of said cover members, said container being rotatable from each of said stationary positions to the other stationary position in a path of movement which moves a respective one of said cover members upwardly through a downwardly facing rinsing position to a position wherein it is the uppermost cover member in said other stationary position, both of said cover members being disposed in said closed positions when said container is disposed in said stationary position, each of said cover members being disposed in open position when said cover member is disposed in said rinsing position, passageways for feeding liquid downwardly into and out of said container through said screens when said container is disposed in said stationary positions, and means including said passageways for feeding liquid upwardly toward said first-mentioned screen in a rinsing operation when the respective cover member in which each said passageway is located is disposed in said rinsing position therefor.

13. The combination as defined in claim 12, and in which said first-mentioned means includes a rotatable shaft projecting outwardly from said body portion for rotation therewith and having two parallel passageways disposed therein and connected to a respective one of said first-mentioned passageways, said shift being mounted in an elongated stationary sleeve having an inlet passageway and an outlet passageway extending through opposite sides thereof in such position that said inlet passageway and said outlet passageway are connected to the respective ones of said parallel passageways which are connected to the passageways in the uppermost and lowermost ones of said cover members, respectively, when said container is disposed in said stationary positions.

14. The combination as defined in claim 13, and in which said second-mentioned means includes two passageways in said shaft and extending generally radially outwardly from respective ones of said parallel passageways in position to connect said inlet passageways to the re-respective ones of said parallel passageways connected to said passageways in the lowermost ones of said cover members, respectively, when either of said cover members is disposed in said rinsing position.

15. A brewing apparatus comprising a support housing, a brewing container having a body portion and two oppositely disposed cover members pivotally mounted on said body portion for pivotal movement between open and closed positions relative to the latter, said container having one brewing position wherein one of said cover members is disposed above the other of said cover members and another brewing position wherein said other cover member is disposed above said one cover member, two shafts rotatably mounting said container in said housing for rotation between said brewing positions, said container having two rinsing positions and two brewing-material-receiving positions, said container being sequentially movable through one of said rinsing positions and one of said brewing-material-receiving positions and through the other of said rinsing positions and the other of said brewing-material-receiving positions during rotation of said container from said one brewing position to said other brewing position and from said other brewing position to said one brewing position, respectively, locking means on said housing in position to positively hold said cover members in closed position when said container is disposed in said brewing positions, cam means on said housing, cam followers on said cover members in position to operatively engage said cam means and move said other cover member to open position during rotation of said container from said one brewing position to said other brewing position and move said one cover member to open positions during rotation of said container from said other brewing position to said one brewing position, means, including one of said shafts, for feeding brewing liquid into said container through the uppermost one of said cover members and out of said container through the lowermost one of said cover members when said container is disposed in said brewing positions, other means, including said last-mentioned means, for feeding rinsing water through the lowermost one of said cover members onto said cover member when said lowermost cover member is in open position and said container is moving through said rinsing positions, and means controlled by the position of the other of said shafts for feeding brewing material into the uppermost one of said cover members when said uppermost cover member is disposed in open position and said container is moving through said brewing-material-receiving positions.

16. A brewing apparatus as defined in claim 15, and in which said means for feeding brewing liquid into said container includes two passageways in said one shaft and extending longitudinally therein, a sleeve having two passageways therein, said last-mentioned passageways being disposed in communication with respective one of said first-mentioned passageways when said container is disposed in said brewing position, and in which said other means includes two passageways in said one shaft and extending transversely to the length thereof in position to connect respective ones of said first-mentioned passageways to the other respective ones of said second-mentioned passageways when said container is disposed in said rinsing position.

17. A valve comprising an elongated sleeve having an inlet opening and an outlet opening extending outwardly from the bore of said sleeve, a shaft mounted in said sleeve in rotatable relation thereto, said shaft having two elongated passageways disposed therein and terminating in spaced relation to the outer surface thereof, said shaft also having inlet means extending radially outwardly therethrough from respective ones of said elongated passageways in uniplanar relation to said inlet opening, and outlet means extending radially outwardly therethrough from respective ones of said elongated passageways in uniplanar relation to said outlet opening, all of said means and said openings being disposed in such position that when said inlet opening is disposed in communication with said inlet means and thereby with one of said elongated passageways, said outlet opening is disposed in communication with the said outlet means disposed in communication with the other of said elongated passageways, and other passageways connected to respective ones of said elongated passageways and extending outwardly through said shaft, and means in said shaft for reversing the connection of said elongated passageways to said openings when said openings are disposed out of communication with said inlet and outlet means.

18. A valve comprising an elongated sleeve having an inlet opening and an outlet opening spaced from each other axially of said sleeve and extending outwardly from the bore of said sleeve, a shaft mounted in said sleeve in rotatable relation thereto, said shaft having two elongated passageways disposed therein and terminating in spaced relation to the outer surface thereof, said shaft also having two inlet passageways extending radially outwardly therethrough from respective ones of said elongated passageways in uniplanar relation to said inlet opening, and two outlet passageways extending radially outwardly therethrough from respective ones of said elongated passageways in uniplanar relation to said outlet opening, all of said passageways and said openings being disposed in such position that when said inlet opening is disposed in communication with either of said inlet passageways and thereby with one of said elongated passageways said outlet opening is disposed in communication with the one of said outlet passageways disposed in communication with the other of said elongated passageways, two other passageways extending radially outwardly through said shaft from respective ones of said elongated passageways and adapted to be connected to means for interconnecting said two elongated passageways, and means for reversing the flow of liquid through said elongated passageways during rotation of said shaft in said sleeve, said means comprising two additional passageways extending transversely outwardly through said shaft from respective ones of said elongated passageways and opening outwardly through said shaft in uniplanar relation to said inlet passageways, the outer ends of said additional passageways being disposed on said shaft between said inlet passageways and in position wherein said outer ends are disposed in communication with said inlet opening when said inlet passageways are disposed out of communication with said inlet opening.

19. In a valve, an elongated shaft having two parallel passageways disposed longitudinally therein, two other passageways in communication with respective ones of said first-mentioned passageways and extending radially outwardly through said shaft, two uniplanar inlet passageways in communication with respective ones of said first-mentioned passageways and extending radially outwardly through said shaft, two uniplanar outlet passageways in communication with respective ones of said first-mentioned passageways and extending radially outwardly through said shaft, a sleeve mounted on said shaft in rotatable relation relative thereto, said sleeve being disposed in covering relation to the outer ends of said inlet and outlet passageways, said sleeve having an inlet passageway therethrough disposed in uniplanar relation to said two uniplanar inlet passageways, and an outlet passageway therethrough disposed in uniplanar relation to said two uniplanar outlet passageways, all of said inlet and outlet passageways being so disposed relative to each other that when said inlet passageway in said sleeve is disposed in communication with either one of said uniplanar inlet passageways connected to one of said first-mentioned passageways, said outlet passageway in said sleeve is in communication with the one of said uniplanar outlet passageway communicating with the other of the first-mentioned passageways, and two other passageways connected to respective ones of said first-mentioned passageways and extending transversely outwardly through said shaft, said transverse passageways terminating at their outer ends in position to be disposed in communication with said inlet opening when said inlet and outlet openings are disposed out of communication with said two uniplanar inlet passageways and said two uniplanar outlet passageways.

20. A valve comprising an elongated sleeve having an inlet opening and an outlet opening extending outwardly from the bore of said sleeve, a shaft mounted in said sleeve in rotatable relation thereto, said shaft having two elongated passages therein, said shaft having at least one passageway extending therethrough and communicating with one of said elongated passages, said shaft having at least one passageway extending therethrough and communicating with the other of said elongated passages, all of said passageways and said openings being constructed in such a manner that said openings are adapted to communicate with said passageways when said shaft has been rotated a predetermined amount with respect to said sleeve, two other passageways communicating with respective ones of said elongated passages and extending outwardly through said shaft, and means for reversing the connection of said elongated passages to said openings when said openings are disposed out of communication with said passageways.

References Cited in the file of this patent

UNITED STATES PATENTS

| | | |
|---|---|---|
| 2,910,928 | Rota | Nov. 3, 1959 |
| 2,931,288 | Totten | Apr. 5, 1960 |